(12) United States Patent
Steiner

(10) Patent No.: US 9,813,557 B2
(45) Date of Patent: Nov. 7, 2017

(54) CONDITIONAL ATTRIBUTE MAPPING IN WORK ASSIGNMENT

(71) Applicant: Avaya Inc., Basking Ridge, NJ (US)

(72) Inventor: Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/963,843

(22) Filed: Aug. 9, 2013

(65) Prior Publication Data

US 2015/0043726 A1 Feb. 12, 2015

(51) Int. Cl.
*H04M 3/00* (2006.01)
*H04M 3/523* (2006.01)

(52) U.S. Cl.
CPC .................. *H04M 3/5233* (2013.01)

(58) Field of Classification Search
CPC ............. H04M 3/5175; H04M 3/5183; H04M 3/5191; H04M 3/51; H04M 3/523; H04M 3/5232; H04M 2203/2011; H04M 3/5166; H04M 3/5233; H04M 3/42221
USPC .................. 379/265.09, 265.12, 266.01
See application file for complete search history.

(56) References Cited

U.S. PATENT DOCUMENTS

| | | | | |
|---|---|---|---|---|
| 5,828,747 A | * | 10/1998 | Fisher | H04M 3/5233 |
| | | | | 379/265.12 |
| 6,917,898 B1 | * | 7/2005 | Kirubalaratnam et al. | .. 702/179 |
| 6,973,176 B1 | * | 12/2005 | Chism | H04M 3/5233 |
| | | | | 379/265.12 |
| 8,180,043 B2 | * | 5/2012 | Dezonno et al. | ........ 379/265.11 |
| 8,634,543 B2 | * | 1/2014 | Flockhart et al. | ....... 379/266.01 |
| 2003/0108185 A1 | * | 6/2003 | Brown | H04M 3/523 |
| | | | | 379/266.01 |
| 2010/0235218 A1 | | 9/2010 | Erhart | |
| 2010/0296417 A1 | | 11/2010 | Steiner | |
| 2011/0125793 A1 | | 5/2011 | Erhart | |
| 2011/0125826 A1 | | 5/2011 | Erhart | |
| 2011/0255681 A1 | | 10/2011 | Flockhart | |
| 2011/0255682 A1 | | 10/2011 | Flockhart | |
| 2011/0255683 A1 | | 10/2011 | Flockhart | |
| 2013/0236002 A1 | * | 9/2013 | Jennings et al. | ......... 379/265.12 |
| 2014/0016766 A1 | * | 1/2014 | Strandberg | ............. H04M 3/00 |
| | | | | 379/265.09 |

* cited by examiner

*Primary Examiner* — Rasha Al Aubaidi
(74) *Attorney, Agent, or Firm* — Sheridan Ross P.C.

(57) ABSTRACT

A contact center, methods, and mechanisms are provided for assigning work items to resources using attributes that conditionally expand a selectable pool of resources. The work item is first analyzed for any required, preferred, and conditional attributes and then queued in multiple resource attribute sets for work assignment. Work items are assigned to resources by considering a match between the analyzed attributes of a work item and a resource while observing alternative assignment conditions. When met, the alternative assignment conditions cause the work item to be queued in additional resource attribute sets thereby expanding the pool of selectable resources. Once assigned, the work item may be removed from queues not selected in the work assignment.

20 Claims, 6 Drawing Sheets

300

| Identifier | Work Item Information | Subject Matter | Required Attribute(s) | Preferred Attribute(s) | Conditional Attribute(s) | Workflow Status |
|---|---|---|---|---|---|---|
| 304 | 308 | 312 | 316 | 320 | 324 | 328 |

| Identifier | Resource Information | Attribute Information | Resource Status |
|---|---|---|---|
| 404 | 408 | 412 | 416 |

*FIG. 4*

| Work Item A ||||||
|---|---|---|---|---|---|
| R/P/C | Language | Department | Communication Medium | | XN |
| Required | English | | | | |
| Preferred | | Tech Support | Voice | | YN |
| Conditional 1 | | General | Text Message | ••• | ZN |
| Conditional 2 | | Sales | Email | | |
| ⋮ ||||||
| Conditional N | | Dept. N | Comm. Med. N | | |

*FIG. 6A*

| Work Item B ||||||
|---|---|---|---|---|---|
| R/P/C | Language | Department | Communication Medium | | XN |
| Required | | | Voice | | |
| Preferred | English | Accounts | | | BN |
| Conditional 1 | French | Sales | | ••• | CN |
| Conditional 2 | | General | | | |
| ⋮ ||||||
| Conditional N | | Dept. N | | | |

*FIG. 6B*

CONDITIONAL ATTRIBUTE MAPPING IN WORK ASSIGNMENT

FIELD OF THE DISCLOSURE

The present disclosure is generally directed toward communications and more specifically toward contact centers.

BACKGROUND

Contact centers can provide numerous services to customers, and have been doing so for years. The idea of a contact center queue is not much different from that of standing in line at a bank and waiting to be helped by the next available teller. However, there can be significant frustration if the first, second, or even third teller cannot answer a given question or set of questions. The same frustrations have been known to occur in contact centers. A company can gain customer satisfaction if they are able to answer their customers' questions quickly and accurately.

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts.

As products and problems become more complex and diverse in nature, it becomes less likely that a single agent possesses all of the skills or expertise to fully service customer contacts. To service customer contacts more effectively, contact centers route contacts to one or more resources with specific skills and attributes. These attributes and/or skills may include but are not limited to proficiency in spoken languages, technical expertise, communication ability (e.g., sign language, TTY, texting, SMS, email, phone, video phone, and the like), preferred work type, department, and combinations thereof. For example, contact centers that handle computer customer service may have application resources, hardware resources, operating system resources, network resources, etc. While these resources may be well-qualified to answer questions on their particular subject(s), they are often unqualified to answer questions involving subjects outside of their respective skill sets. Still, these resources may be assigned to work items based on at least one attribute, skill, and rule-based match used by a contact center's work assignment mechanism.

It is one goal of a contact center to maintain good customer service when handling contacts, and as such, work items are typically assigned to qualified agents in a timely and efficient manner. In some cases, however, the suboptimal assignment of one or more work items to resources may go unnoticed by a contact center. As a result, suboptimal assignments may continue and contact center performance as well as long-term customer service may suffer.

SUMMARY

Typically, contact centers can provide any number of services to customers. As the number of services increases so does the demand for excellent customer service. In some cases, the goal of excellent customer service can be directly linked to a minimal wait time and assignment with a qualified resource. In other words, the less time that a customer waits before being assisted by a qualified resource (e.g., agent, automated service, etc.), the better the customer feels about their customer service experience. Traditionally, contact centers employed a work assignment approach where a work item was sent to multiple places to be answered quickly, or queued by resource skill. In using this approach, the first resource that became available to service a queued work item was then assigned to the queued work item. Once the work item was assigned to a resource, other queued versions of that work item were cancelled, or marked abandoned, from other queues. Unfortunately, the traditional approach and system fails to provide any intelligence or preference when choosing one skill over other skills. In addition, the system tended to provide skewed metrics and other inaccurate calculations when reporting performance metrics of the contact center.

It is with respect to the above issues and other problems that the embodiments presented herein were contemplated. Among other things, the present disclosure provides methods, devices, and systems that can consider multiple attributes or attribute sets associated with a work item and resource in assigning work. Examples of attributes that a resource may possess include, without limitation, language ability, fluency for a language, level of understanding for a language, skill (e.g., billing, customer service, troubleshooting, accounts receivable, accounts payable, product knowledge, departments, etc.), skill level (e.g., trainer, trainee, expert, associate, etc.), willingness to participate, attitude rating (e.g., via peer, customer, supervisor, technical, survey, etc.), gender, age, nationality, experience, historical KPIs (e.g., call resolution rate, close rate, conversion rate, etc.), busyness, location, availability, presence information, preferred communication type (e.g., media, medium, real-time, near-real-time, non-real-time, etc.), communication device type, and combinations thereof.

Moreover, the present disclosure can essentially fine-tune work assignment queuing and significantly improve customer service by providing conditional attribute selection in work assignments. Among the conditions considered in the work assignment, the present disclosure anticipates assigning work based on using an order of required attributes, preferred attributes, conditional attribute alternatives, and/or other considered attributes. In one embodiment, work may be assigned in order by required attributes, then most preferred attributes, and then alternative attributes. At any instance in time, the preferred attribute resource may become available (e.g., a preferred agent logs into the contact center, finishes a call, etc.). As such, the work assignment may keep assignment options open as long as possible to assign a work item based on the attribute order. In other words, alternative attributes may be considered by the work assignment mechanism only after an alternative assignment condition has been met. Examples of an alternative assignment condition may include, but are not limited to, one or more of emergency, timer, long wait time, time of day, customer paid for level (e.g., bronze, silver, gold, etc.), and the like. Among other things, this preferred attribute ordered, or conditional attribute mapping in, work assignment can allow for any preferred assignments to be made before alternatives are considered. In some cases, queuing to multiple queues may gradually, or incrementally, expand the potential pool of resources by making some attributes conditional and/or having multiple attributes in the same category.

In some embodiments, the contact center or system may record queue metrics that can include, but are in no way limited to, one or more of Average Speed to Answer (ASA), Queued Count, Average Wait Time (AWT), Estimated Wait Time (EWT), and the like. In one embodiment, the queue metrics may be associated with only one attribute set. For instance, the queue metrics may be maintained for the first "preferred" queue or attribute set. Among other things, this approach can simplify the metrics as other attribute set metrics would not be required to be adjusted. For example, if a work item is queued to four attribute sets, and the queued count on each is incremented, then the total work in the contact center, or system, is not the sum of all work queued. Continuing this example, when the work item is de-queued (i.e., removed from a queue) each and every queue count would need to be decremented in order for the queue counts to add up correctly. As the number of metrics increases, so would the complexity of the problem. Accordingly, it is an aspect of the present disclosure that the queue metrics are associated with a first selection, or choice. As can be appreciated, the present disclosure can at least provide for accurate queue counts based on this approach because, inter alia, the total work in the system is the sum of all work queued (e.g., where the only work items that are included in the sum that are those work items that are associated with queue metrics for a particular attribute set).

In one embodiment, work assignments may be made using require attributes, prefer and consider alternative attributes, and prefer and conditionally consider alternatives. Using a prefer attribute may allow work to be enqueued on the preferred attribute-set. Alternatives may be added to the attribute-sets associated with the work, mirroring the way multiple attribute-sets are associated to a single resource. When selecting a resource, the service-map in the work assignment engine may be set to include the consider services. Any resource that may match the preferred or the consider services will qualify. Additionally or alternatively, work assignments may include a scoring system to prefer a resource marked as preferred.

By way of example, a caller may contact a contact center and provide the following information, "I speak English and French and want to be connected with Sales." This information may be collected via an Interactive Voice Response (IVR), gateway, an agent, website, text, or other information gathering system associated with the contact center. The information can then be associated with a work item that represents the contact. The conditional attribute manager may interpret the work item information as preferring Sales-English, while considering Sales-French. Accordingly, the system may first determine whether the preferred attributes (e.g., Sales, English) exist in any resources before determining alternative, or conditional, attributes (e.g., Sales, French). In some cases, the work assignment may wait until reaching a predetermined condition before the conditional attributes are considered. Examples of a predetermined condition may include, but are in no way limited to, a long wait, the expiration of timer, an event, an emergency, and the like.

In another example, a caller may provide the following information, "I would prefer to speak with someone in Sales who speaks English, but Sales is alright." In this case, the work item may include a preference for English and Sales. This preference may indicate that a medium of communication (e.g., voice, text, multi-media, etc.) be associated with an English presentation thereof (e.g., an English speaking resource, an English-based text presentation, etc.). Although the work item includes a preference for English and Sales, the work assignment may assign the work to a Sales resource, regardless of the English preference, upon reaching a predetermined condition. For instance, the Sales resource may present a communication as a translation of another language into English.

Similarly, the contact center may employ various rules in the assignment of work items that utilize a structured prefer and consider alternative attributes order. For example, a rule may be included where after a certain time of day (e.g., 5:00 pm, etc.) only the operator is staffed by the contact center. As such, the system may seek resources with Sales and English attributes, but if the time is after the certain time of day (e.g., 5:00 pm, etc.) the work assignment may consider the operator. Additionally or alternatively, a rule may be included such that if after a certain wait time (e.g., 10 minutes, etc.) the work item may be assigned to any available resource. As such, the system may seek resources with Sales and English attributes, but if the wait time is greater than a certain amount (e.g., 10 minutes, etc.) the work assignment may consider any available resource. In another embodiment, the contact center may employ a rule that considers resources for a work item assignment in stages based on the attribute of a specific customer level (e.g., Bronze, Silver, Gold, etc.) that is associated with the work item. An example of this rule allow a Bronze-level work item to prefer a Bronze-level resource in assignment, but if a specific time period (e.g., 20 seconds) passes and no assignment is made the system may also consider Silver-level resources, and if another specific time period (e.g., 40 seconds) passes where no assignment is made, the system may also consider Gold-level resources in work assignment. In some embodiments, consider may include attributes in a resource search, while prefer may indicate that the resource is preferred in the event a choice must be made by the work assignment mechanism.

Another embodiment may include selecting a site based on estimated wait time (EWT) using certain attributes (e.g., Sales and English). For example, a site may be a property and a single pool may eliminate the need to select the lowest EWT.

In some embodiments, one or more resources may represent an agent, group, queue, site, contact center, and/or combination of work handling entities. For instance, agents, queues, and sites may all be viewed as resources and can be assigned attributes. These attributes may include, but are not limited to, languages spoken, departments, media channels supported, what products or services are supported, and the like. For attributes that are agent specific like occupancy and idle time, for queues and sites the occupancy of the least occupied agent and the idle time of the agent with the longest idle time may be used. In other cases, like handle time, quality scores, or revenue, the average for all agents in the queue or site for the metric may be used.

It is anticipated that the analysis of work item assignments may be performed automatically via at least one component of a work assignment mechanism of a contact center. This analysis may be performed in real-time, near-real-time, and/or in non-real-time. Additionally or alternatively, the determination and management of conditional attributes may be performed automatically via a conditional attribute manager. In at least one embodiment, the conditional attribute manager may be a part of the work assignment mechanism of a contact center.

In some embodiments, a conditional attribute manager may receive at least one of state information, agent selection information, and queue information from one or more contact centers. This resource information may be stored remotely from, or outside of, a work assignment mechanism. Additionally, or alternatively, the information may be stored locally within a memory of a contact center. In one embodiment, the resource information may be stored as data in a table, bitmap, or at least one other database. In some cases, the data may be updated at times to maintain accurate resource information. The update of resource information may be achieved via any one or more of the modes disclosed herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures:

FIG. 3 is a block diagram depicting a work item data structure used in accordance with embodiments of the present disclosure;

FIG. 4 is a block diagram depicting a resource data structure used in accordance with embodiments of the present disclosure;

FIG. 6A is a block diagram depicting an exemplary work item data structure for a first work item in accordance with embodiments of the present disclosure;

FIG. 6B is a block diagram depicting an exemplary work item data structure for a second work item in accordance with embodiments of the present disclosure.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
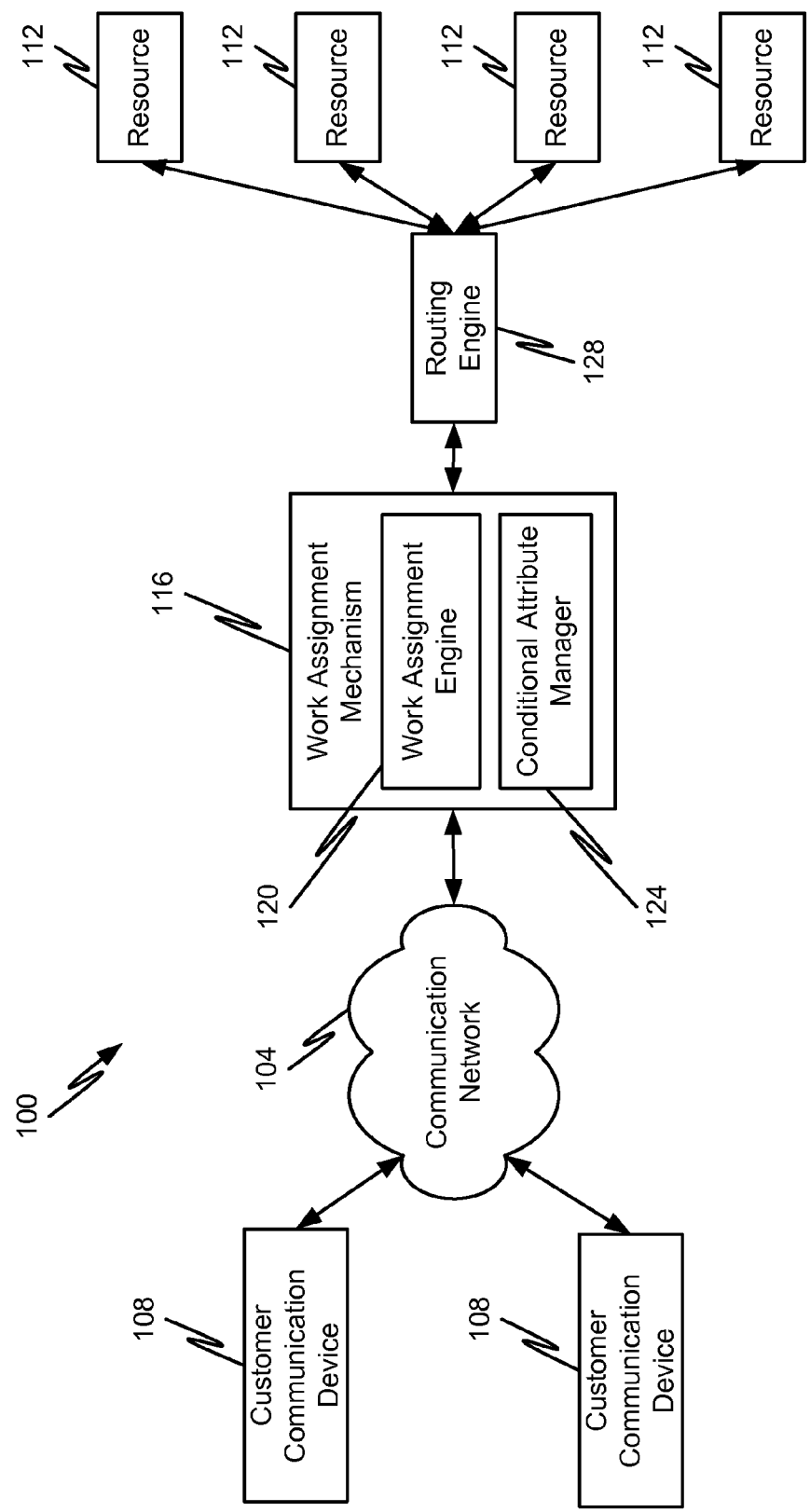
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference for all that it teaches and for all purposes. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Exemplary work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively, each of which are hereby incorporated herein by reference in their entirety for all they teach and for all purposes.

The format of the work item may depend upon the capabilities of the communication device 108 and the format of the communication. In some embodiments, work items are logical representations within a contact center of work to be performed in connection with servicing a communication received at the contact center (and more specifically the work assignment mechanism 116).

Although the routing engine 128 is depicted as being separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 128.

The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers, and may include contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference for all that it teaches and for all purposes.

More specifically, the work assignment engine 120 can determine which of the plurality of processing resources 112 is eligible and/or qualified to receive a work item and further determine which of the plurality of processing resources 112 is best suited to handle the processing needs of the work item. In situations of work item surplus, the work assignment engine 120 can also make the opposite determination (i.e., determine optimal assignment of a work item to a resource). In some embodiments, the work assignment engine 120 is configured to achieve true one-to-one matching.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In addition to comprising the work assignment engine 120, the work assignment mechanism 116 may also comprise a conditional attribute manager 124. As discussed above, the conditional attribute manager 124 may be configured as a module that is capable of monitoring work assignments in determining to assign work based on conditional attributes. This monitoring may include determining whether a work item has been assigned to a resource. Additionally or alternatively, the monitoring may include determining whether an alternative assignment condition has been met. In some embodiments, the conditional attribute manager 124 may employ one or more rules to restrict a resource pool size from which work assignments may be made. This restriction in resource pool size may be configured to change based on a detection of at least one alternative assignment condition. Additionally or alternatively, the conditional attribute manager 124 may employ one or more rules to expand a resource pool from which work assignments may be made. As disclosed herein, the conditional attribute manager 124 may gradually, or incrementally, increase the number of resources 112 (e.g., resource pool size) based on conditional attributes associated with a work item.

Rules may be stored remotely, or apart, from the conditional attribute manager 124 or work assignment mechanism 116. In some cases, the rules may be stored locally to the conditional attribute manager 124 or work assignment mechanism 116. It is anticipated that the conditional attribute manager 124 may be configured to exclude or include resources 112 in performing work assignments via the work assignment mechanism 116.

It is an aspect of the present disclosure that the conditional attribute manager 124 may communicate with the work assignment mechanism 116, its components, and/or other contact center components (e.g., the routing engine 128, resources 112, and the like). Work items may be routed at the direction of the conditional attribute manager 124 and/or work assignment engine 120. The routing may include directing the work item to one or more resources 112. Additionally or alternatively, the routing may include altering the assignment of a work item as directed by the work assignment engine 120. In other words, the conditional attribute manager 124 may be incorporated into the work assignment engine 120.

Figure 2:
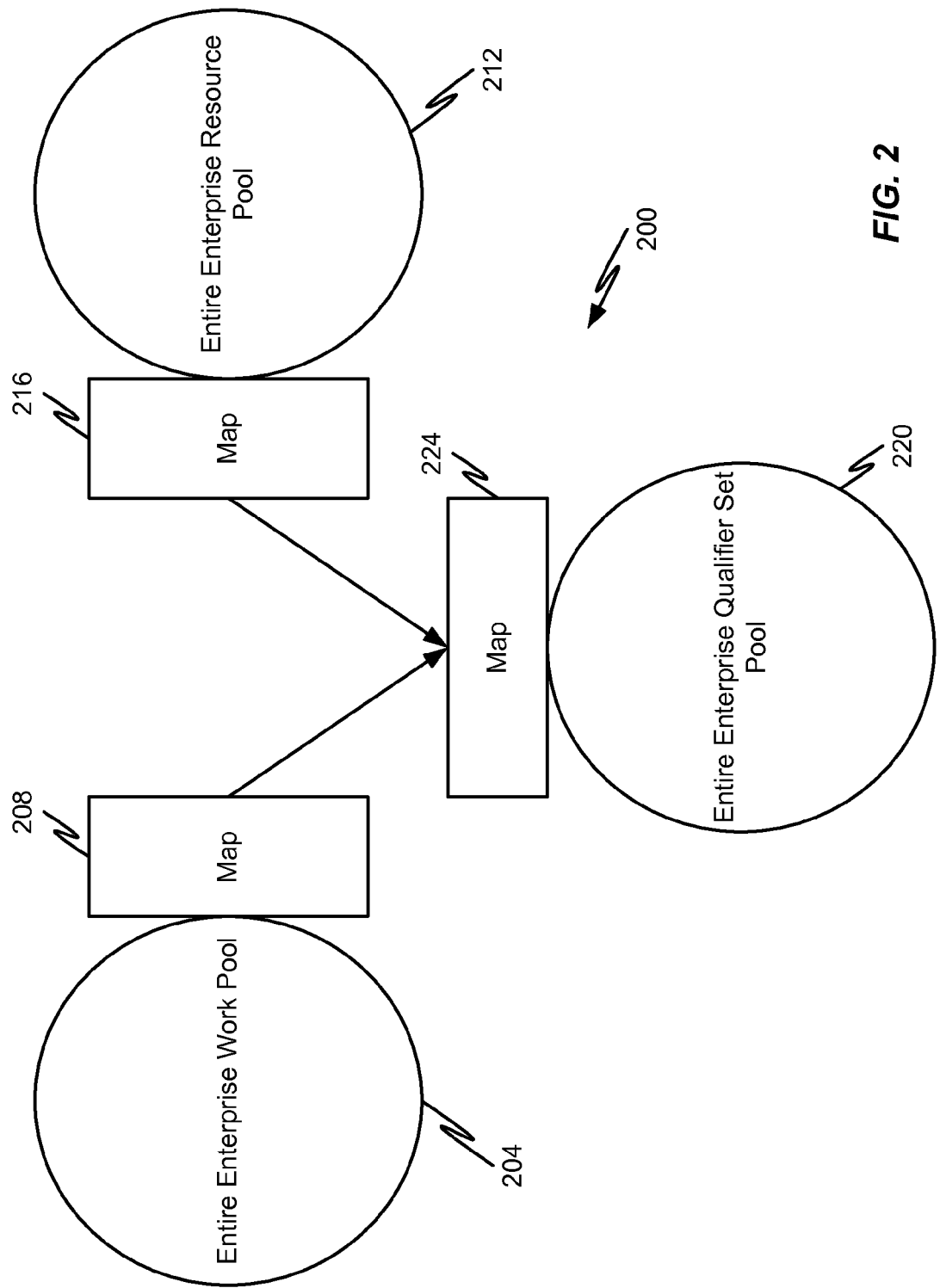
FIG. 2 is a block diagram depicting exemplary pools and bitmaps that are utilized in accordance with embodiments of the present disclosure.

FIG. 2 depicts exemplary data structures 200 which may be incorporated in or used to generate bitmaps/tables used by the work assignment engine 120. The exemplary data structures 200 include one or more pools of related items. In some embodiments, three pools of items are provided, including an enterprise work pool 204, an enterprise resource pool 212, and an enterprise qualifier set pool 220. The pools are generally an unordered collection of like items existing within the contact center. Thus, the enterprise work pool 204 comprises a data entry or data instance for each work item within the contact center.

In some embodiments, the population of the work pool 204 may be limited to work items waiting for service by a resource 112, but such a limitation does not necessarily need to be imposed. Rather, the work pool 204 may contain data instances for all work items in the contact center regardless of whether such work items are currently assigned and being serviced by a resource 112 or not. The differentiation between whether a work item is being serviced (i.e., is assigned to a resource 112) may simply be accounted for by altering a bit value in that work item's data instance. Alteration of such a bit value may result in the work item being disqualified for further assignment to another resource 112 unless and until that particular bit value is changed back to a value representing the fact that the work item is not assigned to a resource 112, thereby making that resource 112 eligible to receive another work item.

Similar to the work pool 204, the resource pool 212 comprises a data entry or data instance for each resource 112 within the contact center. Thus, resources 112 may be accounted for in the resource pool 212 even if the resource 112 is ineligible due to its unavailability because it is assigned to a work item or because a human agent is not logged-in. The ineligibility of a resource 112 may be reflected in one or more bit values.

The qualifier set pool 220 comprises a data entry or data instance for each qualifier set within the contact center. In some embodiments, the qualifier sets within the contact center are determined based upon the attributes or attribute combinations of the work items in the work pool 204. Qualifier sets generally represent a specific combination of attributes for a work item. In particular, qualifier sets can represent the processing criteria for a work item and the specific combination of those criteria. Each qualifier set may have a corresponding qualifier set identified "qualifier set ID" which is used for mapping purposes. As an example, one work item may have attributes of language=French and intent=Service and this combination of attributes may be assigned a qualifier set ID of "12" whereas an attribute combination of language=English and intent=Sales has a qualifier set ID of "13." The qualifier set IDs and the corresponding attribute combinations for all qualifier sets in the contact center may be stored as data structures or data instances in the qualifier set pool 220.

In some embodiments, one, some, or all of the pools may have a corresponding bitmap. Thus, a contact center may have at any instance of time a work bitmap 208, a resource bitmap 216, and a qualifier set bitmap 224. In particular, these bitmaps may correspond to qualification bitmaps which have one bit for each entry. Thus, each work item in the work pool 204 would have a corresponding bit in the work bitmap 208, each resource 112 in the resource pool 212 would have a corresponding bit in the resource bitmap 216, and each qualifier set in the qualifier set pool 220 may have a corresponding bit in the qualifier set bitmap 224.

In some embodiments, the bitmaps are utilized to speed up complex scans of the pools and help the work assignment engine 120 make an optimal work item/resource assignment decision based on the current state of each pool. Additionally or alternatively, the bitmaps may be utilized by the conditional attribute manager 124 in efficiently identifying and managing conditional resources. Accordingly, the values in the bitmaps 208, 216, 224 may be recalculated each time the state of a pool changes (e.g., when a work item surplus is detected, when a resource surplus is detected, and/or when rules for administering the contact center have changed).

FIG. 3 is a block diagram depicting a work item data structure 300 used in accordance with embodiments of the present disclosure. Specifically, each work item may have a corresponding data structure 300 which identifies the work item in an identifier information field 304, provides customer and work item related data in a work item information field 308, identifies the subject matter of the work item in a subject matter information field 312, identifies one or more required attributes in a required attributes field 316, identifies one or more preferred attributes in a preferred attributes field 320, identifies one or more conditional attributes in a conditional attributes field 324, and designates position of the work item in a contact center via a workflow status information field 328.

The identifier information field 304 may comprise data that identifies the work item media type. This field 304 may be used by the conditional attribute manager 124 in directing work items to work assignment and/or one or more resources 112. The identifier information field 304 may be used to track the work item while it is being processed through a contact center. Additionally, or alternatively, the identifier information field 304 may include data to track a work item in real-time, near-real-time, or non-real-time. For example, data relating to the handling of a work item may be evaluated after the work item has been handled (e.g., non-real-time) to provide information to improve handling techniques. Among other things the identifier information field 304 may comprise data that can be used to differentiate between various work items received by a call center.

The work item information field 308 may comprise data that identifies a customer associated with the work item. In some embodiments, the work item information field 308 may comprise one or more bits which describe whether the customer associated with the work item has paid for, or is assigned to, a quality level or grade. Among other things, the field 308 may be used to identify attributes of the work item including but not limited to technical ability, quality level, service grade (e.g., increasing in grade from lowest to highest, such as, bronze, silver, gold, platinum, etc.) and the like. For example a work item may be treated differently in routing and/or pushing to one or more resources 112 if it is determined that the customer associated with the work item has paid for the best service levels (e.g., either gold or platinum) available. This information may be contained in the work item information field 308. Additionally, or alternatively, the work item information field 308 may include identification data relating to a specific customer that may be used by, at least, the conditional attribute manager 124 in referring to stored data, preferences, and/or historical information relating to the customer.

The subject matter information field 312 may comprise one or more bits or bit values which identify the subject matter area that is used to appropriately route the work item. This field 312 may include general or specific information relating to the subject matter of the work item. For example, a sample work item may wish to inquire about implementing SIP presence functionality in an existing telecommunications system. As such, the subject matter information filed 312 may be coded to identify SIP presence and implementation as the appropriate subject matter to be used in routing and/or pushing the work item to one or more resources 112.

The required attributes field 316 may comprise one or more bits or bit values that identify any required attributes associated with the work item. In some embodiments, the work assignment mechanism 116, or its various components (e.g., the work assignment engine 120, conditional attribute manager 124, etc.), may utilize information contained in the required attributes field 316 to match a work item with a resource 112, or vice versa. As such, one or more of the required attributes contained in the required attributes field 316 may be matched to one or more attributes associated with a suitable resource 112. For example, the field 316 may include "English" as a required attribute. In one embodiment, the "English" required attribute may indicate that any information (e.g., speech, text, multi-media, etc.) communicated to the contact must be presented in English. Continuing this example, the work assignment mechanism 116 may determine one or more resources 112 that possess the required attribute "English." As a result, the work item may be queued in at least one English attribute resource pool.

The preferred attributes field 320 may comprise one or more bits or bit values that identify any preferred attributes associated with the work item. In some embodiments, the work assignment mechanism 116, or its various components (e.g., the work assignment engine 120, conditional attribute manager 124, etc.), may utilize information contained in the preferred attributes field 320 to match a work item with a resource 112, or vice versa. As such, one or more of the preferred attributes contained in the preferred attributes field 320 may be matched to one or more attributes associated with a suitable resource 112. In addition to considering preferred attributes in matching work items and resources 112, the work assignment mechanism 116 may refer to required attributes (if any) in the required attributes field 316. In some embodiments, the work assignment mechanism 116 may determine that more than one resource 112 is eligible to service a work item. In these cases, the work assignment mechanism 116 may refer to the preferred attributes field 320 of the work item and select the resource 112 that possesses the most preferred attributes contained in the field 320.

For example, a work item may include a required attribute of "English" (contained in the required attribute field 316) and a preferred attribute of "Sales" (contained in the preferred attribute field 320). Prior to assigning the work item, the work assignment mechanism 116 may determine that a first and a second resource are available that both resources possess the required attribute (English). In this case, the work assignment mechanism 116 may determine whether the first and second resources include any of the preferred attributes contained in the work item's preferred attribute field 320. Continuing the example, the second resource may include the preferred attribute (Sales) while the first may not. In this instance, the second resource may be selected to service the work item.

In another example, a first resource may become available having the required attribute (English) but that does not have the preferred attribute (Sales). In some embodiments, the work assignment mechanism 116 may be instructed, via the conditional attribute manager 124, to only consider selecting the a resource that does not include a preferred attribute after a predetermined condition is met. Examples of the predetermined condition may include, but are in no way limited to, waiting a period of time, the expiration of a timer, finding no resources containing a preferred attribute, and combinations thereof. For instance, although the first resource is available, the work assignment mechanism 116 may search for other resources containing the preferred attribute until the predetermined condition is met. In the event that a second resource is determined to contain the preferred attribute, and the predetermined condition has not been met, then the work assignment mechanism 116 may select the second resource to service the work item. This selection may be made even though the first resource having the required attribute was determined to be available first. In contrast, if no other resources are found to contain the preferred attribute, and the predetermined condition is met, the work assignment mechanism 116 may select the first resource to service the work item.

The conditional attribute field 324 may comprise one or more bits or bit values that identify one or several conditional attributes associated with the work item. In some embodiments, the work assignment mechanism 116, or its various components (e.g., the work assignment engine 120, conditional attribute manager 124, etc.), may utilize information contained in the conditional attributes field 324 to match a work item with a resource 112, or vice versa. As such, one or more of the conditional attributes contained in the conditional attributes field 324 may be matched to one or more attributes associated with a suitable resource 112. In addition to considering conditional attributes in matching work items and resources 112, the work assignment mechanism 116 may refer to preferred attributes in the preferred attributes field 324 and required attributes (if any) in the required attributes field 316. In some embodiments, the work assignment mechanism 116 may determine that more than one resource 112 is eligible to service a work item. In these cases, the work assignment mechanism 116 may be instructed by the conditional attribute manager 124 to refer to the preferred attributes field 320 of the work item, and then the conditional attributes field 324 of the work item, and select the resource 112 that possesses the most preferred attributes and then the most conditional attributes, in that order. The order may be based on conditional rules associated with the conditional attribute manager 124.

The workflow status information field 328 may comprise data as to the position of a work item in a contact center workflow. For instance, the field 328 may indicate whether the work item is at least one of received, assigned, queued, in process, terminated, handled, and otherwise disposed. In some embodiments, the conditional attribute manager 124 may refer to the workflow status information field 328 to determine if a work item requires further routing and/or direction.

Referring now to FIG. 4, a block diagram depicting a resource data structure 400 is shown in accordance with embodiments of the present disclosure. Specifically, each resource 112, may have a corresponding data structure 300 which identifies the resource in an identifier information field 404, provides resource related data in a resource information field 408, identifies the attributes of the resource in an attributes field 412, and identifies a status of the resource 112 in a contact center via a resource status information field 416.

The identifier information field 404 may comprise data that identifies the resource 112. This field 404 may be used by the conditional attribute manager 124 in directing work items to work assignment and/or one or more resources 112. For instance, the identifier information field 404 may include a resource 112 name, or unique identification. Continuing this example, a work item may be received at a contact center where it is analyzed by a work assignment mechanism 116. Upon determining that the work item is a prior customer and has been historically handled, or serviced by, a specific resource 112, the work assignment mechanism 116 may use the identifier information to match the resource 112 with the received work item. The identifier information field 404 may be used to track work serviced by the resource 112. Additionally, or alternatively, the identifier information field 404 may include data to track a resource's work in real-time, near-real-time, or non-real-time. For example, data relating to the handling of a work item may be evaluated after the work item has been handled (e.g., non-real-time) to provide information to improve handling techniques. Among other things the identifier information field 404 may comprise data that can be used to differentiate between various resources 112 of a call center.

The resource information field 408 may comprise data relevant to the resource 112 and/or the resource's performance. For example, the resource information field 408 may include, but is not limited to, historical work item handling performance, peer rating, supervisor rating, training status, combinations thereof, and the like.

The attribute information field 412 may comprise one or more bits or bit values that identify any required attributes associated with the resource 112. In some embodiments, the work assignment mechanism 116, or its various components (e.g., the work assignment engine 120, conditional attribute manager 124, etc.), may utilize information contained in the attribute information field 412 to match a work item with a resource 112, or vice versa. As such, one or more of the attributes contained in the attribute information field 412 may be matched to one or more attributes associated with a work item. For example, the field 412 for a particular resource 112 may include the following attributes: "English," "Sales," and "Expert." The work assignment mechanism 116 may determine that a work item requires the attribute "English." Additionally or alternatively, the work item may prefer "Sales." In both cases, the work item may be queued with the particular resource 112 based on the information contained in the attribute information field 412. Among other things, the field 412 may be used to identify attributes of the resource 112 including but not limited to technical ability, quality level, service grade (e.g., increasing in grade from lowest to highest, such as, bronze, silver, gold, platinum, etc.) and the like.

The resource status information field 416 may comprise data as to the availability of a resource 112 in a contact center. For instance, the field 416 may indicate whether the resource is at least one of busy, free, away, and the like. In some embodiments, the conditional attribute manager 124 may refer to the resource status information field 416 to determine if a work item can be assigned to a work item.

Figure 5:
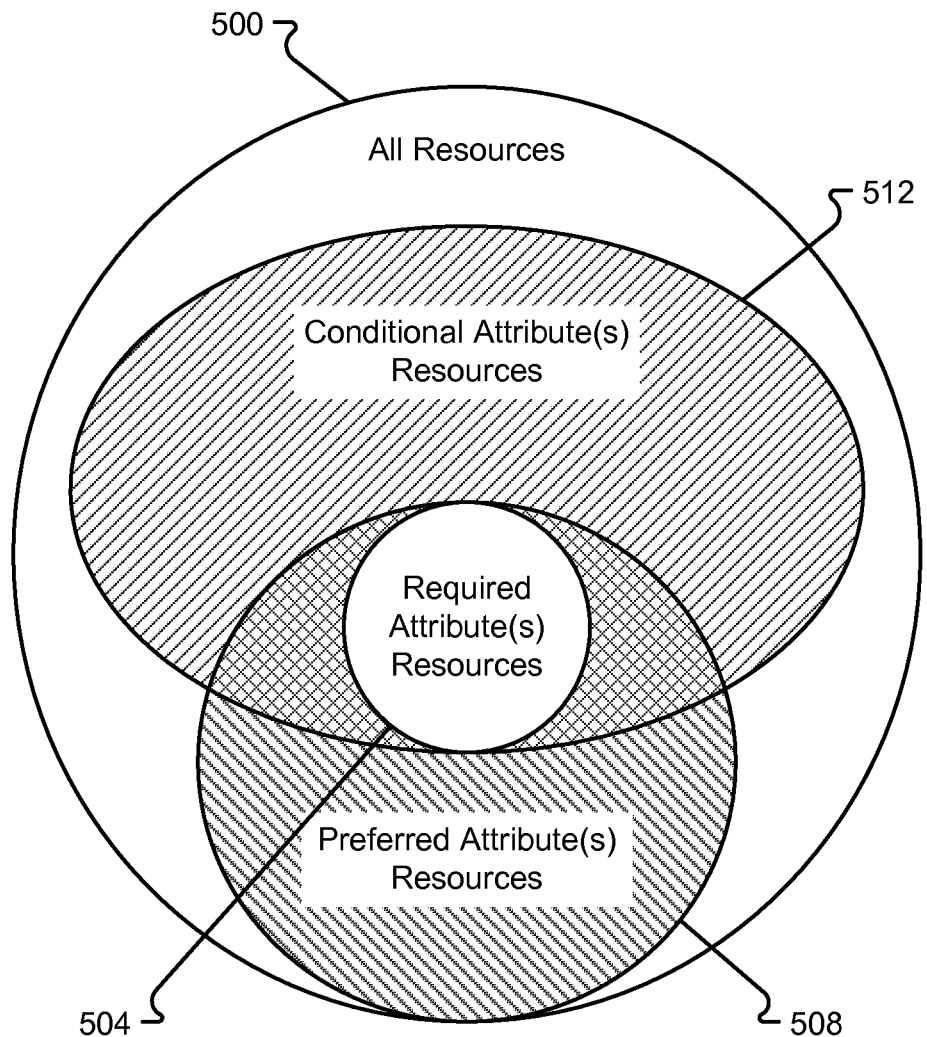
FIG. 5 is a block diagram depicting an increasing resource pool during a conditional attribute work assignment in accordance with embodiments of the present disclosure.

FIG. 5 is a block diagram depicting a variable pool of available resources during a conditional attribute work assignment in accordance with embodiments of the present disclosure. When making work assignments, the work assignment mechanism 116 may make match a work item with a resource 112 from at least one resource taken from all of the contact center resources 500. In some embodiments, the work item may include required attributes (e.g., in a required attribute field 316, etc.). These required attributes, like any other attributes disclosed herein, may be provided by a customer directly (e.g., via communication, in response to a prompt, etc.) and/or indirectly (e.g., via detecting a customer identifier, a contact address, a phone number, an Internet Protocol (IP) address, Media Access Control (MAC) address and the like).

In one embodiment, the work assignment mechanism 116 may determine a set of required attribute resources 504 that have the required attributes associated with a work item. As can be appreciated, the set of required attribute resources 504 determined may change depending on the work item. In other words, as the required attributes may change for each work item, so may the required attribute resources 504 determined by the work assignment mechanism 116.

As the conditional attribute work assignment proceeds, the work assignment mechanism 116 may consider preferred attributes associated with the work item (e.g., in the preferred attribute field 320) to select a set of corresponding preferred attribute resources 508. In some embodiments, a work item may include required attributes as well as preferred attributes. In other embodiments, a work item may include preferred attributes without including any required attributes. In any event, the conditional attribute manager 124 may direct the work assignment mechanism 116 to consider resources 112 for matching with a work item in a structured order that first includes required attributes (if any), then includes preferred attributes in the consideration (if any), and then include at least one conditional attribute (if any). Additionally or alternatively, this structured order may gradually increase the number of possible resources 112 considered by proceeding from a narrow set of preferred attribute resources 508 to a broader set of conditional attribute resources 512. In some embodiments, the work assignment mechanism 116 may be configured to select a resource 112 from a set of preferred attribute resources 508 when more than one resource 112 is available to service the work item.

FIGS. 6A and 6B are block diagrams depicting exemplary work item data structures 604, 608 in accordance with embodiments of the present disclosure. In some embodiments, Work Items A and B may represent contacts received by a contact center. When the contacts are received, respective data structures 604, 608 may be generated. Each data structure 604, 608 may include any required, preferred, and/or conditional attributes. As shown, the data structures 604, 608 may include one or more attributes, such as, Language, Department, Communication Medium, and more. Additionally, the data structures 604, 608 may indicate whether the work item's attributes are required, preferred, first conditional, second conditional, and so on.

Referring to FIG. 6A, for example, the data structure 604 for Work Item A may represent an English speaking monoglot customer who would prefer to reach the Tech Support department and engage in Voice communications. In some cases, a customer may only wish to communicate in a single language. Because the customer associated with Work Item A is a monoglot, the English language attribute is required. In the present example, the customer would consider a General department and Text Messaging communications if the preferred attributes cannot be found in a resource 112. In some embodiments, the work item may include other alternative conditions if a preferred conditional attribute cannot be found in a resource 112. Continuing the example above, the customer may accept the Sales department and Email communications if the preferred and first conditional attributes cannot be matched to a suitable resource 112. In some embodiments, if an attribute is required there may not be a preferred or a conditional alternative. For example, the customer associated with Work Item A may only speak English, and as such, it would not be acceptable for the work assignment mechanism 116 to consider any other language attribute when searching for a suitable resource 112 match.

In FIG. 6B the data structure 608 for Work Item B may represent a vision impaired English and French speaking polyglot customer who would prefer to speak English and reach the Accounts department. Because the customer may be vision impaired, the Voice communication medium may be a required attribute. However, in the present example, the customer would consider speaking French and reaching the Sales department if the preferred attributes cannot be found in a resource 112. In some embodiments, the work item may include other alternative conditions if a preferred conditional attribute cannot be found in a resource 112. The customer associated with Work Item B may accept the General department if the preferred and first conditional attributes cannot be matched with a suitable resource 112. It should be appreciated that any number of conditional attributes and preferred levels of conditional attributes may be included in the data structure 608.

Figure 7:
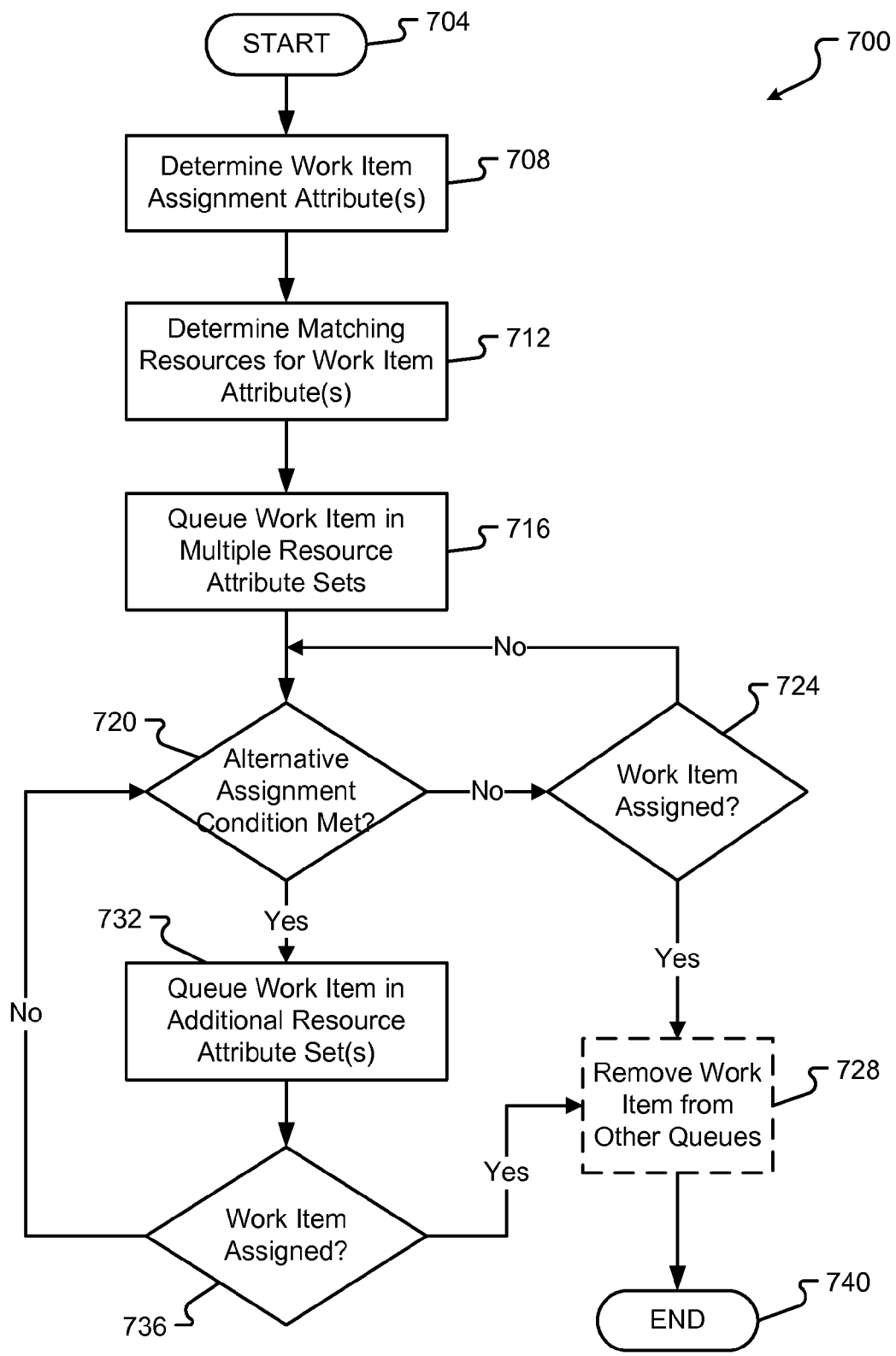
FIG. 7 is a flow diagram depicting a method of assigning work using conditional attribute mapping in accordance with embodiments of the present disclosure.

Referring to FIG. 7 a flow diagram depicting a method 700 of assigning work using conditional attribute mapping is shown in accordance with embodiments of the present disclosure. The method 700 begins at step 704 and proceeds by determining attributes associated with a work item (step 708). The work item may represent a contact received at a contact center and attributes may be provided by a customer associated with the contact. In one example, the attributes may be provided in response to one or more prompts presented by a first resource of the contact center. In some cases, this resource may be a gateway, an IVR, an operator, combinations thereof, and the like. Determining attributes may include identifying one, some, or all of the required, preferred, and conditional attributes of the work item. In some embodiments the determination may be made by the work assignment mechanism 116 or its various components (e.g., the work assignment engine 120, the conditional attribute manager 124, etc.). Identifying whether an attribute is required, preferred, and/or conditional may be based on language, phrasing, emphasis, question order, prompt order, content, context, etc.

The method 700 continues by the work assignment mechanism 116 determining matching resources 112 for at least some of the determined work item attributes (step 712). In some embodiments, the work assignment mechanism 116 may determine resources possessing one or more of the required attributes, preferred attributes, and conditional attributes associated with the work item. Identification of these determined resources may be stored in a memory associated with the conditional attribute manager 124. Additionally or alternatively, the identification of the determined resources may be stored by attribute type in resource sets.

Next, the method 700 continues by queuing the work item in multiple resource attribute sets (step 716). Multiple attribute sets may include resources grouped by particular attributes. For instance a first set may include required and a first preferred attribute, while a second set may include a required and a second preferred attribute. In some embodiments, the work item may be queued in a required attribute resource set at a first time. At a second, the work item may be queued in a preferred attribute resource set. At a third time, the work item may be queued in at least one conditional attribute resource set.

Additionally or alternatively, multiple instances of the work item may be queued in various resource attribute sets. For example a first instance of the work item may be queued in a required attribute set (e.g., a set of resources where each resource contains the required attributes of the work item). At the same time, a second instance of the work item may be queued in a required and preferred attribute set (e.g., a set of resources where each resource contains the required and at least some of the preferred attributes). In some cases, a third instance of the work item may be queued in a required/conditional attribute set (e.g., a set of resources where each resource contains the required and at least some of the conditional attributes). In one embodiment, one or more instances of each work item (e.g., the second and third instances) may act as a placeholder until an alternative assignment condition is met. If a resource becomes available to service a work item, but the alternative assignment condition has not been met, the placeholder moves into a standby position of the queue. A standby position may indicate a position of a work item not available for service by a resource. However, if a resource becomes available to service a work item, and the alternative assignment condition has been met, the work item may be serviced by the resource. This approach allows multiple instances to be queued without needing to be active until an alternative assignment condition is met.

The conditional attribute manager 124 may then determine whether an alternative assignment condition is met (step 720). Examples of alternative assignment conditions may include, but are not limited to, an emergency, a timer, a long wait time, a time of day, a customer paid for level (e.g., bronze, silver, gold, platinum, etc.), a response to a failed work assignment, and the like. In some embodiments, the alternative assignment condition may be set at or about the time when the work item is queued in multiple resource attribute sets (see step 716). In other embodiments, the alternative assignment condition may be set at any time or in response to a state of the contact center, work item, customer, etc. In one example, the expiration of a timer may qualify as meeting the alternative assignment condition.

If the alternative assignment condition is not met, the method 700 may continue by determining whether the work item has been assigned (step 724). If not yet assigned, the method 700 may continue to determine whether the alternative assignment condition has been met (step 720). However, if the work item has been assigned to a resource 112, the method 700 may proceed by removing the work item, or instances of the work item, from other queues (step 728). In the event that two or more resources become available to service a work item at or about the same time, the conditional attribute manager 124 may determine the resource best suited to handle the work item. Assignment of the work item may include referring to stored rules to determine which attributes have a higher rating than others, and selecting the resource with the highest attribute rating. The method may then end (at step 740).

In some cases, the alternative assignment condition may be met, in which case, the method 700 continues by queuing the work item in additional conditional resource attribute sets (step 732). For example, a work item may be queued in resource sets, where each resource is associated with at least one preferred attribute. As an alternative assignment condition, a timer may be associated with the wait time of the work item and initiated when the work item is queued or first created. Continuing the example, after a given period of time, it may be determined that none of the resources with the preferred attributes are available to service the work item. In this case, the alternative assignment condition may cause the method 700 to queue the work item in other resource sets. Examples of an additional resource attribute sets may include, but are in no way limited to, resources with preferred attributes, conditional attributes, secondary conditional attributes, and the like. In some embodiments, the work item may not be removed from the resource attribute sets in which the work item has been previously queued (at step 716). As such, the pool of resources to which the work item can be assigned is increased with every additional queued resource attribute set.

The method 700 may continue by determining whether the work item has been assigned (step 736). As disclosed herein, the assignment of the work item may follow a structured order. The structured order can provide for a selection of a first resource 112 with one or more preferred attributes to take precedence over another resource 112 having one or more conditional attributes but no preferred attributes. In other words, as the resource attribute set queues are added, the conditional attribute manager 124, in conjunction with other components of the work assignment mechanism 116 may select the best possible match for a work item. Specifically, the conditional attribute manager 124 may select preferred attributes before conditional attributes. Rules may be associated with, and accessed by, the conditional attribute manager 124 to determine resource selection in the event of a conflict (e.g., two resources become available to service the work item at or about the same time).

Additionally or alternatively, the conditional attribute manager may select first conditional attributes before second conditional attributes. In the event the work item has been assigned to a resource 112, the method 700 may proceed by removing the work item, or instances of the work item, from other queues (step 728). This step (728) may also include removing placeholders of work items from queues, whether the placeholder representing the work item is activate or inactive. The method 700 may then end (at step 740). However, if the work item is still not yet assigned, the method 700 may continue to determine whether the alternative assignment condition has been met (step 720). At which point, the method 700 may repeat by queuing the work item in additional conditional resource attribute sets beyond those previously added (step 732). As a result, the pool of resources to which the work item can be assigned may yet again be increased. Once the work item is assigned to at least one resource 112, the method 700 ends (step 740).

It should be appreciated that while embodiments of the present disclosure have been described in connection with a queueless contact center architecture, embodiments of the present disclosure are not so limited. In particular, those skilled in the contact center arts will appreciate that some or all of the concepts described herein may be utilized in a queue-based contact center or any other traditional contact center architecture.

Furthermore, in the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
analyzing, by a processor, via a work assignment mechanism, a work item for one or more attributes, wherein the work item represents a contact received at a contact center, via a network, from a first communication device;
determining, by the processor, from the one or more attributes, a preferred attribute and a conditional attribute for the work item at a first time;
placing, by the processor, the work item in a first work pool for service by a first resource in a first resource pool, wherein the first work pool is an unordered collection of like work items, wherein the first resource pool includes at least one resource possessing the preferred attribute;
after placing the work item in the first work pool, receiving, by the processor, an alternative assignment condition input associated with the work item, wherein the alternative assignment condition input increases a number of resources included in a work assignment decision for the work item;
additionally placing, by the processor and in response to receiving the alternative assignment condition input and while the work item is placed for service by the first resource in the first resource pool, the work item in a different second work pool for service by a second resource in a second resource pool such that the work item is placed in both the first work pool and the second work pool until the work item is assigned to the first or second resource in the first or second resource pool and wherein the second work pool is an unordered collection of like work items and wherein the second resource pool includes at least one resource having the conditional attribute and not the preferred attribute; and
routing, by the processor, the work item to a communication device of the first or second resource in the first or second resource pool from one of the first work pool or the second work pool.

2. The method of claim 1, further comprising:
receiving a subsequent alternative assignment condition input associated with the work item, wherein the subsequent alternative assignment condition input increases a number of resources included in the work assignment decision for the work item; and
placing, in response to receiving the subsequent alternative assignment condition input and while the work item is placed in the first and second work pools, the work item in a different third work pool for service by a third resource pool, wherein the third work pool is an unordered collection of like work items, wherein the third resource pool includes at least one resource having the conditional attribute, and wherein the work item is placed in the first work pool, the second work pool, and the third work pool.

3. The method of claim 1, further comprising:
determining, that a conditional resource in the second resource pool is available to service the work item;
determining, at substantially the same time, that no preferred resource in the first resource pool is available to service the work item;
assigning the work item to the conditional resource; and
removing the work item from the first work pool and the second work pool.

4. The method of claim 1, further comprising:
determining that a resource in at least one of the first resource pool or the second resource pool is available to service the work item;
selecting the first or second resource from one of the first resource pool or the second resource pool; and
assigning the work item to the selected resource.

5. The method of claim 4, further comprising:
removing the work item from the first work pool and the second work pool.

6. The method of claim 4, wherein the selected resource is a preferred resource in the first resource pool or a conditional resource in the second resource pool.

7. The method of claim 4, further comprising:
associating work pool metrics with only one of the first resource pool or the second resource pool.

8. The method of claim 4, wherein selecting the resource further comprises:
determining a rating associated with attributes of the first resource of the first resource pool and the second resource of the second resource pool, wherein the rating indicates a number of attributes matched to the one or more attributes of the work item; and
selecting the resource having the rating that indicates a greatest number of the attributes of the resource matching the one or more attributes of the work item.

9. The method of claim 4, wherein the alternative assignment condition input is associated with a wait time of the work item in the first work pool, wherein the preferred attribute is a first language, wherein the conditional attribute is a second language, and wherein the work item is placed into the second work pool based on the wait time of the work item in the first work pool.

10. A contact center, comprising:
a work assignment mechanism contained in memory and executed by a processor, the work assignment mechanism including:
a work assignment engine that analyzes a work item for one or more attributes, wherein the work item represents a contact received at a contact center, via a network, from a first communication device;
a conditional attribute manager that determines, from the one or more attributes, a preferred attribute and a conditional attribute for the work item at a first time, places the work item in a first work pool for service by a first resource in a first resource pool, wherein the first resource pool includes at least one resource possessing the preferred attribute, after placing the work item in the first work pool, receives an alternative assignment condition input associated with the work item, wherein the alternative assignment condition input increases a number of resources included in a work assignment decision for the work item, and additionally places, in response to receiving the alternative assignment condition input and while the work item is placed for service by the first resource in the first resource pool, the work item in a different second work pool for service by a second resource in a second resource pool such that the work item is placed in both the first work pool and the second work pool until the work item is assigned to the first or second resource in the first or second resource pool, wherein the second resource pool includes at least one resource having the conditional attribute and not the preferred attribute; and a routing engine that routes the work item to a communication device of the resource in the first or second resource pool from one of the first work pool or the second work pool.

11. The contact center of claim 10, wherein the conditional attribute manager determines that the first or second resource in at least one of the first resource pool or the second resource pool is available to service the work item, select the first or second resource from one of the first resource pool or the second resource pool, and assign the work item to the selected resource.

12. A server, comprising:

a processor; and a computer readable medium, coupled to the processor and comprising instructions stored thereon that cause the processor to:

analyze a work item received at a contact center for one or more attributes, wherein the work item is received, via a network, from a first communication device;

determine, from the one or more attributes, a preferred attribute and a conditional attribute for the work item at a first time;

place the work item in a first work pool for service by a first resource in a first resource pool, wherein the first resource pool includes at least one resource possessing the preferred attribute;

after placing the work item in the first work pool, receive an alternative assignment condition input associated with the work item, wherein the alternative assignment condition input increases a number of resources included in a work assignment decision for the work item;

additionally place, in response to receiving the alternative assignment condition input and while the work item is placed for service by the first resource in the first resource pool, the work item in a different second work pool for service by a second resource in a second resource pool such that the work item is placed in both the first work pool and the second work pool until the work item is assigned to the first or second resource in the first or second resource pool, and wherein the second resource pool includes at least one resource having the conditional attribute and not the preferred attribute; and route the work item to a communication device of the first or second resource in the first or second resource pool from one of the first work pool or the second work pool.

13. The server of claim 12, wherein the processor is further caused to:

receive a subsequent alternative assignment condition input associated with the work item, wherein the subsequent alternative assignment condition input increases a number of resources included in the work assignment decision for the work item; and place, in response to receiving the subsequent alternative assignment condition input and while the work item is placed for service by the first resource in the first resource pool and the second resource in the second resource pool, the work item in a different third work pool for service by a third resource pool, wherein the third resource pool includes at least one resource having the conditional attribute, and wherein the work item is placed in the first work pool, the second work pool, and the third work pool.

14. The server of claim 12, wherein the processor is further caused to:

determine that a conditional resource in the second resource pool is available to service the work item;

determine at substantially the same time, that no preferred resource in the first resource pool is available to service the work item;

assign the work item to the conditional resource in the second resource pool; and removing the work item from the first work pool and the second work pool.

15. The server of claim 12, wherein the processor is further caused to:

determine that the first or second resource in one or more of the first resource pool or the second resource pool is available to service the work item;

select the first or second resource from one of the first resource pool or the second resource pool; and assign the work item to the selected resource.

16. The server of claim 15, wherein the processor is further caused to remove the work item from the first work pool and the second work pool.

17. The server of claim 15, wherein the selected resource is a preferred resource in the first resource pool or a conditional resource in the second resource pool.

18. The server of claim 15, wherein the processor is further caused to associate work pool metrics with only one of the first resource pool or the second resource pool.

19. The server of claim 15, wherein selecting the resource from one of the first resource pool or the second resource pool further causes the processor to:

determine a rating associated with attributes of the first resource of the first resource pool and the second resource of the second resource pool, wherein the rating indicates a number of attributes matched to the one or more attributes of the work item; and selecting the resource having the rating that indicates a greatest number of the attributes of the resource matching the one or more attributes of the work item.

20. The server of claim 12, further comprising a qualifier set pool, wherein the qualifier set pool represents the preferred attribute and the conditional attribute.

* * * * *